(12) United States Patent
Yan et al.

(10) Patent No.: US 8,861,546 B2
(45) Date of Patent: Oct. 14, 2014

(54) DYNAMICALLY AND FAIRLY ALLOCATING RF CHANNEL BANDWIDTH IN A WIDEBAND CABLE SYSTEM

(75) Inventors: Anlu Yan, Boxborough, CA (US); Jin Sheng, Boxborough, MA (US); Chad Mikkelson, Arlington, MA (US); Nicos Achilleoudis, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 898 days.

(21) Appl. No.: 12/399,457

(22) Filed: Mar. 6, 2009

(65) Prior Publication Data

US 2010/0226390 A1 Sep. 9, 2010

(51) Int. Cl.
*H04J 3/16* (2006.01)

(52) U.S. Cl.
USPC .......................................... 370/468

(58) Field of Classification Search
None
See application file for complete search history.

(56) References Cited

U.S. PATENT DOCUMENTS

| | | | |
|---|---|---|---|
| 5,592,480 A | 1/1997 | Carney et al. | |
| 5,918,019 A | 6/1999 | Valencia | |
| 5,982,748 A * | 11/1999 | Yin et al. ...................... | 370/232 |
| 6,137,793 A | 10/2000 | Gorman et al. | |
| 6,229,790 B1 | 5/2001 | Butrym et al. | |
| 6,434,141 B1 | 8/2002 | Oz et al. | |
| 6,819,682 B1 | 11/2004 | Rabenko et al. | |
| 6,842,429 B1 | 1/2005 | Shridhar et al. | |
| 6,993,353 B2 | 1/2006 | Desai et al. | |
| 7,065,779 B1 | 6/2006 | Crocker et al. | |
| 7,113,484 B1 | 9/2006 | Chapman et al. | |
| 7,126,920 B2 | 10/2006 | Venkatesulu et al. | |
| 7,139,923 B1 | 11/2006 | Chapman et al. | |
| 7,184,433 B1 | 2/2007 | Oz | |
| 7,218,901 B1 | 5/2007 | Mobley et al. | |
| 7,274,679 B2 | 9/2007 | Amit et al. | |
| 7,292,578 B1 | 11/2007 | Kerr et al. | |
| 7,349,430 B1 | 3/2008 | Chapman | |
| 7,523,329 B2 * | 4/2009 | Ezra et al. ...................... | 713/320 |
| 7,562,168 B1 | 7/2009 | Yifrach et al. | |
| 2002/0052927 A1 | 5/2002 | Park | |
| 2002/0093955 A1 | 7/2002 | Grand et al. | |
| 2002/0106017 A1 | 8/2002 | Dombkowski et al. | |
| 2002/0131403 A1 | 9/2002 | Desai et al. | |
| 2002/0131426 A1 | 9/2002 | Amit et al. | |
| 2002/0133618 A1 | 9/2002 | Desai et al. | |

(Continued)

FOREIGN PATENT DOCUMENTS

WO 0072509 11/2000

OTHER PUBLICATIONS

Max-min Utility Fairness in Link Aggregated Systems: Mohanty, IEEE, 2007.*

(Continued)

*Primary Examiner* — Kevin C Harper
*Assistant Examiner* — Samina Choudhry
(74) *Attorney, Agent, or Firm* — Leon R. Turkevich (57) ABSTRACT

In one example, a Cable Modem Termination System (CMTS) determines target Radio Frequency (RF) bandwidth amounts for Data Over Cable System Interface Specification (DOCSIS) bonding groups according to the DOCSIS priority of active flows within the bonding groups. The CMTS then tunes bandwidth allocation amongst the DOCSIS bonding groups according to the target bandwidth amounts. The target bandwidth amounts can be recalculated at intervals, and the bandwidth allocation re-tuned at the intervals, to account for changes in flow activity or DOCSIS priority assignment.

20 Claims, 5 Drawing Sheets

(56) References Cited

U.S. PATENT DOCUMENTS

| | | | |
|---|---|---|---|
| 2002/0136203 | A1 | 9/2002 | Liva et al. |
| 2002/0141585 | A1 | 10/2002 | Carr |
| 2002/0154655 | A1 | 10/2002 | Gummalla et al. |
| 2002/0191691 | A1 | 12/2002 | Holborow |
| 2003/0002540 | A1 | 1/2003 | Eerenberg et al. |
| 2003/0009765 | A1 | 1/2003 | Linden et al. |
| 2003/0212999 | A1 | 11/2003 | Cai |
| 2004/0161098 | A1 | 8/2004 | Suzuki et al. |
| 2004/0163129 | A1 | 8/2004 | Chapman et al. |
| 2004/0244043 | A1 | 12/2004 | Lind et al. |
| 2005/0122966 | A1 | 6/2005 | Bowes |
| 2005/0232304 | A1 | 10/2005 | Quigley |
| 2005/0265376 | A1 | 12/2005 | Chapman et al. |
| 2005/0265392 | A1 | 12/2005 | Fox et al. |
| 2005/0265397 | A1 | 12/2005 | Chapman et al. |
| 2006/0039380 | A1* | 2/2006 | Cloonan et al. ............ 370/395.4 |
| 2006/0168612 | A1 | 7/2006 | Chapman et al. |
| 2007/0049216 | A1 | 3/2007 | Karaoguz |
| 2007/0053321 | A1 | 3/2007 | Beales |
| 2007/0097907 | A1 | 5/2007 | Cummings |
| 2007/0098007 | A1* | 5/2007 | Prodan et al. ................ 370/443 |
| 2007/0171905 | A1 | 7/2007 | Dai |
| 2008/0095083 | A1 | 4/2008 | Sorenson et al. |
| 2010/0169475 | A1* | 7/2010 | Woundy et al. ............... 709/224 |

OTHER PUBLICATIONS

Mohanty et al.; "Max-min Utility Fairness in Link Aggregated Systems"; High Performance Switching and routing, 2007, HPSR '07, Workshop On, IEEE, PI; May 1, 2007; pp. 1-7.

European Patent Office; International Search Report and Written Opinion for PCT/US2010/026543; Aug. 3, 2010.

CABLELABS, Data-Over-Cable Service Interface Specifications Docsis 3.0 Security Specification, c. 2006-2007, Cable Television Laboratories, Inc., http://cablemodem.com/specifications/specifications30.html.

Bhavesh N. Desai et al., "FastChannel: A Higher-Speed Cable Data Service", AT&T Labs Research, 26 pages, Jan. 2002.

Postel, J., "User Datagram Protocol", RFC768, Aug. 28, 1980, 3 pgs.

Pastel, Jon, Editor, "DARPA Internet Program Protocol Specification", RFC791, Sep. 1981, 45 pages.

Deering, S., "Host Extensions for IP Multicasting", RFC1112, Aug. 1989.

Droms, R., "Dynamic Host Configuration Protocol", RFC2131, Mar. 1997.

Townsley, W. et al., "Layer Two Tunneling Protocol "L2TP"", RFC2661, Aug. 1999, 80 pages.

Cable Television Laboratories, Inc., "Data-Over-Cable Service Interface Specifications DOCSIS 2.0, Radio Frequency Specification", SP-RFIv2.0-I04-030730, 1999-2003, 512 pages.

Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.

Cable Television Laboratories, Inc., "Data-Over-Cable Service Interface Specifications DOCSIS 2.0, Radio Frequency Specification", CM-SP-RFIv2.0-I09-050812, 1999-2005, 534 pages.

Cable Television Laboratories, Inc., "DOCSIS® Set-top Gateway (DSG) Interface Specification" CM-SP-DSG-I02-040804, Copyright 2001-2004.

Cable Television Laboratories, Inc., "DOCSIS® Set-top Gateway (DSG) Interface Specification" CM-SP-DSG-I04-050408, Copyright 2001-2005.

Bhattacharyya, et al., "An Overview of Source-Specific Multicast (SSM)", RFC 3569, Jul. 2003.

Droms, R., et al., "Dynamic Host Configuration Protocol for IPv6 (DHCPv6)", RFC3315, Jul. 2003.

Droms, R., "Stateless Dynamic Host Configuration Protocol (DHCP) Service for IPv6", RFC3736, Apr. 2004.

Chapman, John T., "CMTS Remote PHY for a DOCSIS Network: DMPI Over IP Protocol Specification", RP-SP-DoIP-D1-040715B.doc, Cisco Systems, Inc., EDCS-387722, May 26, 2004.

Cisco Systems, Inc., DHCP and the DOCSIS Configuration File for Cable Modems (DOCSIS 1.0), Document ID: 10961, Sep. 16, 2004.

IEEE Standards, "802.16, IEEE Standard for Local and Metropolitan Area Networks, Part 16: Air Interface for Fixed Broadband Wireless Access Systems", IEEE Std. 802.16/2004, Oct. 1, 2004, 893 pages.

Cable Television Laboratories, Inc., "Data-Over-Cable Service Interface Specifications Modular CMTS", CM-SP-DEPI-W03-050302, 49 pgs., Copyright 2005.

Ramakrishnan, Sangeeta, "Next Generation Edge—Realizing the vision of shared resources and bandwidth", SCTE Conference on Emerging Technologies, Jan. 11-13, 2005, 16 pgs.

Chapman, John T., "Remote PHY Technical White Paper Addendum," Downstream External PHY Interface Specification, Cisco Systems, Inc., EDCS-377253, Jan. 24, 2005.

Cisco Systems, Inc., "Downstream External PHY Interface Specification", SP-DEPI-W2-041101A.DOC, EDCS-408926, Jan. 25, 2005.

Lau, J., et al., "Layer Two Tunneling Protocol—Version 3 (L2TPv3)," RFC3931, Mar. 2005, 94 pages.

Cable Television Laboratories, Inc., "DOCSIS Radio Frequency Interface Specification", CM-SP-RFIv2.0-I10-051209, 538 pgs., Dec. 9, 2005.

Madvinsky, et al., Don't Let Your Modem Be Cloned, Jun. 2000, pp. 1-7, Communications Technology.

Millet, Theft of Service-Inevitable?, Dec. 2005, pp. 1-4, Communications Technology.

ETSI, Data-Over-Cable Systems Part 2 Radio Frequency Interface Specifications, Jan. 2003, pp. 59-66, ES 201 488-2 V1.2.1.

Desai, et al., FastChannel: A Higher-Speed Cable Data Service, AT&T Labs-Research, pp. 1-13, Jan. 2002.

Adoba, et al., Extensible Authentication Protocol (EAP), RFC3748, Jun. 2004, pp. 1-64, Standards Track.

ITU-T Telecommunication Standardization Sector of ITU, Series J: Cable Networks and Transmission of Television, Sound Programme and Other Multimedia Signals, Interactive Systems for Digital Television Distribution, Recommendation J.122, Dec. 2002, 506 pages, International Telecommunication Union.

Stolowitz Ford Cowger LLP, Listing of Related Cases, Nov. 14, 2011.

Utility U.S. Appl. No. 10/358,415, filed Feb. 4, 2003, Wideband Cable System.

Utility U.S. Appl. No. 12/353,946, filed Jan. 14, 2009, Dynamically Allocating Channel Bandwidth Between Interfaces.

Utility U.S. Appl. No. 12/853,220, filed Aug. 9, 2010, Wideband Cable System.

Utility U.S. Appl. No. 12/854,009, filed Aug. 10, 2010, Wideband Cable System.

European Patent Office, Communication Pursuant to Article 94(3) EPC, EP Application No. 10 709 614.1-2415, Jun. 28, 2012, 6 pages.

Stolowitz Ford Cowger LLP, Listing of Related Cases, Jan. 13, 2011.

\* cited by examiner

DYNAMICALLY AND FAIRLY ALLOCATING RF CHANNEL BANDWIDTH IN A WIDEBAND CABLE SYSTEM

TECHNICAL FIELD

The present disclosure relates generally to the field of networking.

BACKGROUND

Cable operators have widely deployed high-speed data services on cable television systems. These data services allow subscriber-side devices, such as personal computers, to communicate over an ordinary cable TV network Hybrid Fiber Coax (HFC) cable. A Cable Modem Termination System (CMTS) connects the cable TV network to a data network, such as the Internet. The Data Over Cable Service Interface Specification (DOCSIS) is one of the cable modem standards used for transferring data over the cable TV network.

In a DOCSIS network, the data traffic is classified by specified fields in the data packet headers into service flows (also referred to as flows, sessions, etc. in non-DOCSIS networks). Each service flow is buffered as it is received by the CMTS and then the CMTS arbitrates release of packets between the buffers for downstream transmission. In the downstream direction, the physical transmission of packets is over physical Radio Frequency (RF) channels to the cable modems.

In the latest DOCSIS version, version 3.0, each service flow can be transmitted over a single one of the RF channels (non-bonded, also called narrowband), or distributed over a plurality of the RF channels (bonded, also called wideband). Consequently, an RF channel can be used to carry a plurality of narrowband transmissions and/or a plurality of portions of wideband transmissions.

Although the wideband transmission scheme as described in DOCSIS 3.0 provides numerous benefits, the use of this wideband transmission scheme with existing arbitration schemes can lead to anomalies. In particular, the mixture of narrowband and wideband transmissions on a same RF channel can cause RF channel bandwidth to be allocated amongst service flows in a way that appears arbitrary in view of DOCSIS priority values or other QoS metrics associated with the service flows. The disclosure that follows solves this and other problems.

DESCRIPTION OF EXAMPLE EMBODIMENTS

Overview

In one example, a Cable Modem Termination System (CMTS) determines target Radio Frequency (RF) bandwidth amounts for Data Over Cable System Interface Specification (DOCSIS) bonding groups according to the DOCSIS priority of active flows within the bonding groups. The CMTS then tunes bandwidth allocation amongst the DOCSIS bonding groups according to the target bandwidth amounts. The target bandwidth amounts can be recalculated at intervals, and the bandwidth allocation re-tuned at the intervals, to account for changes in flow activity or DOCSIS priority assignment.

Description

Several preferred examples of the present application will now be described with reference to the accompanying drawings. Various other examples of the invention are also possible and practical. This application may be exemplified in many different forms and should not be construed as being limited to the examples set forth herein.

Figure 1:
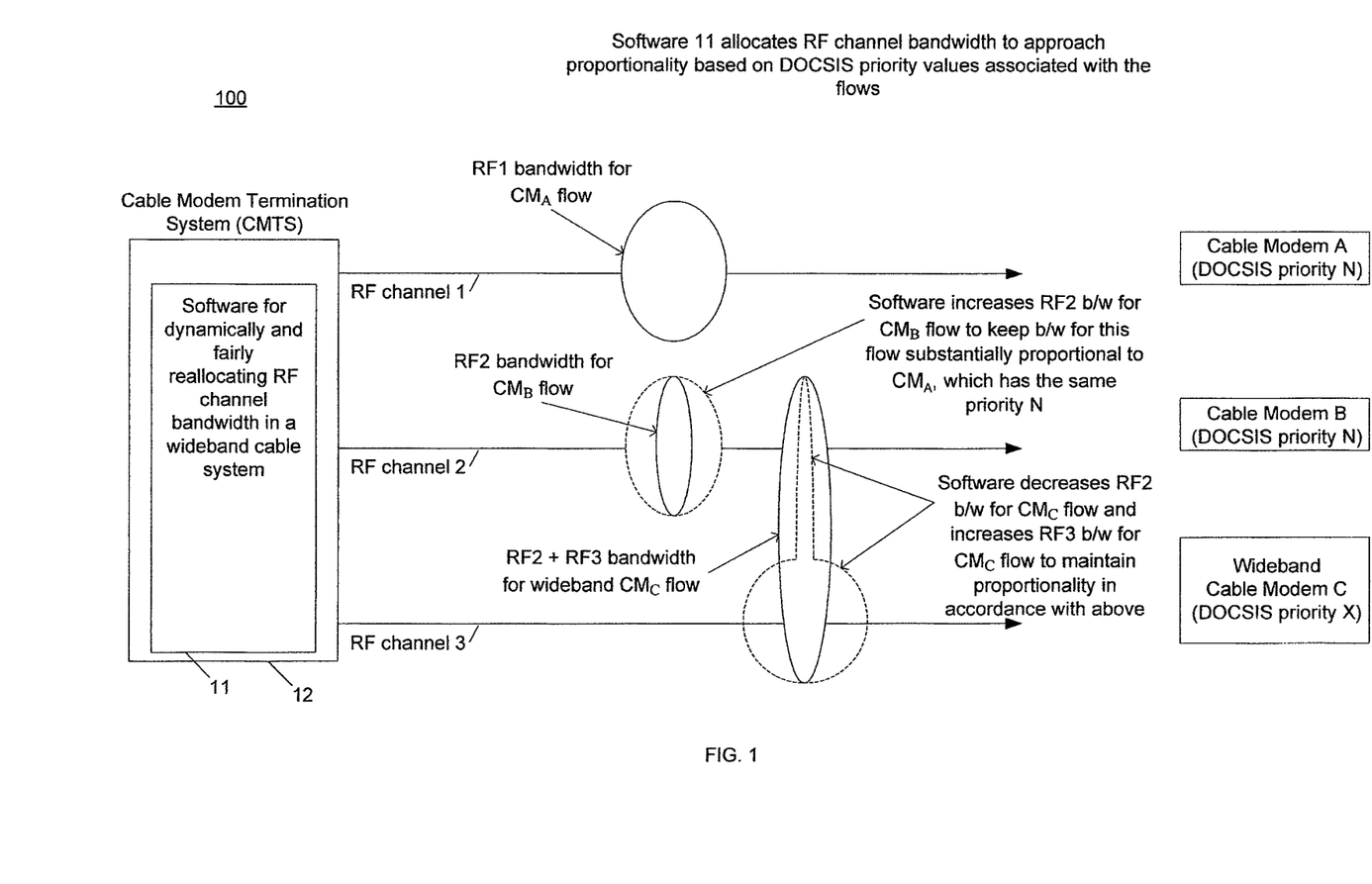
FIG. 1 illustrates one example of a system for dynamically and fairly allocating Radio Frequency (RF) channel bandwidth in a wideband cable system.

FIG. 1 illustrates one example of a system for dynamically and fairly distributing Radio Frequency (RF) channel bandwidth in a wideband cable system.

The example system 100 includes a Cable Modem Termination System (CMTS) 12 configured with software 11. The software 11 is configured to dynamically reallocate bandwidth of Radio Frequency (RF) channels, e.g. the RF channels 1-3, between a plurality of DOCSIS bonding groups.

The software 11 utilizes a fairness scheme to determine how to distribute the RF channel bandwidth amongst the DOCSIS bonding groups. The fairness scheme considers whether or not service flows within the DOCSIS bonding group are active so that RF channel bandwidth can be dynamically allocated towards currently active subscribers. Although activity is one factor, the fairness scheme uniquely balances this factor with the assigned DOCSIS priority of the underlying service flows. This unique balancing will be described later in greater detail with reference to FIG. 2, but for now, it should be understood that a benefit of this balancing is that active subscribers are provided, to the extent possible, with bandwidth in proportion to their DOCSIS priority.

The fairness scheme used by the software 11 is robust in that it can provide proportional bandwidth based on DOCSIS priority (or at least approach proportional bandwidth based on DOCSIS priority) despite imbalances in the underlying topology of the DOCSIS bonding groups. An imbalance in the underlying topology could include, for example, one narrowband subscriber having to share an RF channel with a wideband subscriber while another narrowband subscriber with the same DOCSIS priority does not.

The example that follows with reference to FIG. 1 is helpful for understanding how the software 11 allocates bandwidth in proportion to DOCSIS priority. Also, the example will help the reader appreciate how this fairness scheme can deal with imbalances in the underlying bonding group topology.

In the example, the CMTS 12 sends downstream data to three cable modems (CMs) A-C using the RF channels 1-3. Both narrowband CMs A and B have the same DOCSIS priority N; however, a flow for CM B shares the RF channel 2 with a wideband flow while the flow for CM A utilizes RF channel 1 exclusively. Conventionally, this topology imbalance could have resulted in CM B receiving significantly less bandwidth than CM A (as represented by the smaller solid line oval for the CM B flow as compared to the oval for CM A).

To ensure that the bandwidth allocated to CMs A and B approaches proportionality based on the DOCSIS Priorities, the software 11 dynamically allocates RF channel 2 bandwidth away from the $CM_C$ flow and to the $CM_B$ flow. Accordingly, two subscribers assigned with the same DOCSIS priority N receive substantially the same RF channel bandwidth. It should be noted that the dynamically allocated bandwidth approaches proportionality because the underlying topology does not always allow for perfect fairness (this is represented by the dashed oval for flow $CM_B$ being slightly smaller than the oval for flow $CM_A$).

To maintain proportionality based on DOCSIS Priority, the software 11 also dynamically allocates more RF channel 3 bandwidth to flow $CM_C$ so that the CM C continues to receive its proportion of RF channel bandwidth based on its assigned DOCSIS priority X. This is illustrated by the dashed line shape for flow $CM_C$, which illustrates that the majority of the RF channel bandwidth for flow $CM_C$ is allocated from RF channel 3.

Figure 2:
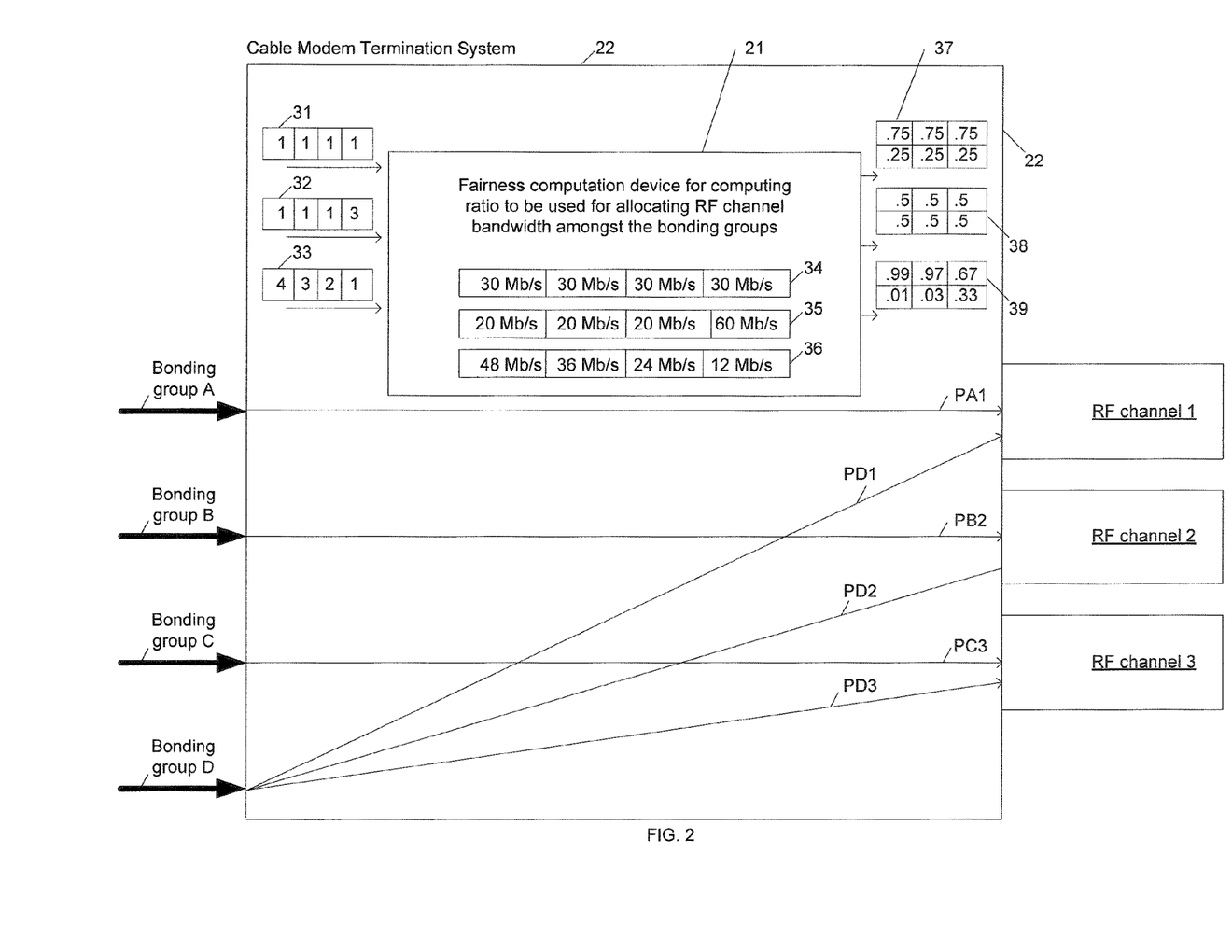
FIG. 2 illustrates one example of the CMTS shown in FIG. 1.

Before turning to FIG. 2, it should be understood that the system 100 can be used with either an Integrated CMTS (I-CMTS) or a Modular CMTS (M-CMTS). In the latter case, the software 11 can operate on the M-CMTS core or the Edge Quadrature Amplitude Modulation (EQAM), or even be distributed across both devices.

Furthermore, it should also be apparent that the fairness scheme can be applied in any type of network where flows or sessions are allocated bandwidth of a fixed bandwidth channel, and where the flows or sessions are assigned a Quality of Service (QoS) metric. In other words, the fairness scheme is not limited to DOCSIS networks or even cable networks.

It should be noted that the apportionment of RF channel bandwidth can be implemented on the fly using the principles described in U.S. patent application Ser. No. 12/353,946 entitled "Dynamically Allocating Channel Bandwidth Between Interfaces", which is herein incorporated by reference in its entirety for all purposes.

An example of a fairness scheme that can be used in the system 100 will now be described with reference to FIG. 2. This example is not intended to be limiting. The software 11 can utilize any other type of fairness scheme that balances service flow activity and assigned DOCSIS priority to approach, or achieve, proportional bandwidth allocation based on DOCSIS priority.

FIG. 2 illustrates one example of the CMTS shown in FIG. 1.

The CMTS 22 includes a fairness computation device 21 configured to determine how the RF channel bandwidth for a group of RF channels is distributed amongst bonding groups utilizing those RF channels, and then set bandwidth allocation accordingly. The fairness computation device 21 can be a processor executing instructions that result in the functionality described below or any other type of circuitry.

Before discussing specific examples, an overview of the operation of the fairness computation device 21 will be described in the next four paragraphs. It may be helpful for the reader to refer back to these four overview paragraphs while subsequently reading the specific examples provided thereafter.

The fairness computation device 21 selects a plurality of bonding groups and then computes a "demand" for each bonding group. The demand for a bonding group is computed by summing the DOCSIS priority of the active flows within that bonding group (it is possible to sum the DOCSIS priority values themselves or any other value based on the DOCSIS priorities of the active flows).

The fairness computation device 21 computes a target bandwidth amount for each bonding group using these computed demands, along with information regarding the amount of finite constant amount of bandwidth available per RF channel (40 Mb/s per RF channel in one example). The computed target bandwidth amounts represents a "fair" amount of bandwidth to provide each bonding group based on that bonding group's determined demand and the total RF channel bandwidth of the RF channels associated with the bonding groups being considered.

The fairness computation device 21 then identifies initial percentages (or ratios) of each RF channel's finite bandwidth to be consumed by bonding groups utilizing that RF channel so that all available RF channel bandwidth is allocated. For example, a wideband bonding group may be given 25% of an RF channel shared with three other bonding groups and 50% of another RF channel shared by only one other bonding group. The initial percentages (or ratios) are then used to determine how much RF channel bandwidth each bonding group will receive based on the potential distribution represented by the initial percentages.

The fairness computation device 21 then checks the RF channel bandwidth amounts based on the potential distribution against the "fair" amounts represented by the target bandwidth amounts. If there is a difference, the initial percentages are "unfair" based on the computed demand, and accordingly, are adjusted to create new percentages. The bandwidth allocations that would result from the new percentages are then checked against the fair amounts to check for unfairness. This tuning continues until no significant improvements are being made (or to a set number of iterations), and then the final percentages are used to allocate the RF channel bandwidth amongst the bonding groups.

For ease of understanding, a specific example will now be discussed with reference to FIG. 2. The bonding groups A-D utilize the RF channels 1-3 as shown in FIG. 2. The arrows PA1, PB2, PC3, PD1, PD2, and PD3 within the CMTS 22 indicate which RF channels 1-3 are utilized by which bonding group A-D. The bonding group D is distributed across all three RF channels 1-3, as shown by arrows PD1, PD2, and PD3.

In the first example, the fairness computation device 21 computes the same demand for all the bonding groups A-D. This could occur, for example, if each bonding group A-D had only one active flow therein and each of the active flows had the same DOCSIS priority, for example. DOCSIS priority ranges from 0-7, so in this example, it is assumed that the single flows of each bonding group A-D has a DOCSIS priority value of 1.

These demand values 31 are then used by the fairness computation device 21 to compute the target bandwidth amounts. The target bandwidth amount for each bonding group is that bonding group's demand over the sum of all bonding group demands (one quarter for each bonding group in this specific example) times the total available RF bandwidth (three RF channels at 40 Mb/s each is 120 Mb/s). Thus, the "fair" amount for bonding group A is 30 Mb/s. The target bandwidth amounts 34 are shown for all the bonding groups A-D.

Initial percentages are then selected by the fairness computation device 21 or fed into the fairness computation device. In this example, it may be easy for the reader to infer that, to keep bandwidth allocation proportional to DOCSIS priority, the initial percentages should be as follows: 75% of RF channel 1 to bonding group A, 25% of RF channel 1 to bonding group D, 75% of RF channel 2 to bonding group B, 25% of RF channel 2 to bonding group D, etc. However, since actual scenarios can be far more complex, the fairness computation device 21 could simply choose 1/N for all the initial ratios for each bonding group, where N is the amount of bonding groups sharing a channel, e.g. ½ or 50% in this example because there are two bonding groups sharing RF channel 1. The initial ratio can be chosen by the fairness computation device 21 as described, or input for the first tuning, but then later tunings can use the final result from the previous tuning as the initial ratio.

The fairness computation device 21 then computes bandwidth per bonding group based on the initial percentages. In this case, with the 50% initial ratios, the computation would result in 20 Mb/s for each of bonding groups A-C and 60 Mb/s for bonding group D.

These bandwidth amounts are unfair based on the target amounts 34, so the initial ratios are tuned to create new ratios. The new ratios would include an increase for bonding groups A-C and a decrease for bonding group D because groups A-C received too little bandwidth based on the targets 34 and bonding group D received too much.

Although any method can be used to tune the initial ratios to create new ratios, the scheme used by the fairness computation device 21 is as follows. The device 21 finds a first one of the bounding group having the most surplus according to the comparison. The device 21 then finds one of its "neighbor" bonding group having the most deficit according to the comparison. A neighbor bonding group is a bonding group that shares at least one RF channel with the bonding group having the most surplus. Then, bandwidth is shifted from the first bonding group to this second neighboring bonding group. The amount shifted can be the sum of the surplus amount and the deficit amount (a negative number).

The tuning continues with the device 21 checking the bonding groups after the shifting to identify which bonding group has the most deficit of bandwidth. Then the device 21 selects the neighbor with the most surplus and shifts surplus bandwidth between these groups accordingly.

After these two bandwidth shifts discussed in the previous two paragraphs, the new ratios may be ready. However, it should be apparent that the process described in the previous paragraph could be repeated any number of times before the new ratios are ready. Once the new ratios are ready, the tuning continues with the new ratios until the process finally ends with the tuned ratios 37 (because a threshold fairness was reached or because a predetermined number of iterations completed), which result in perfectly fair bandwidth allocation based on the target bandwidths.

Another group of demand values 32, along with their target bandwidth amounts 35 and their final tuned ratios 38, are also shown. With the demand values 32, the bonding groups A-C get 50% of their associated RF channel and the bonding group D gets 50% of each RF channel 1-3 as shown in the final tuned ratios 38.

Figure 3:
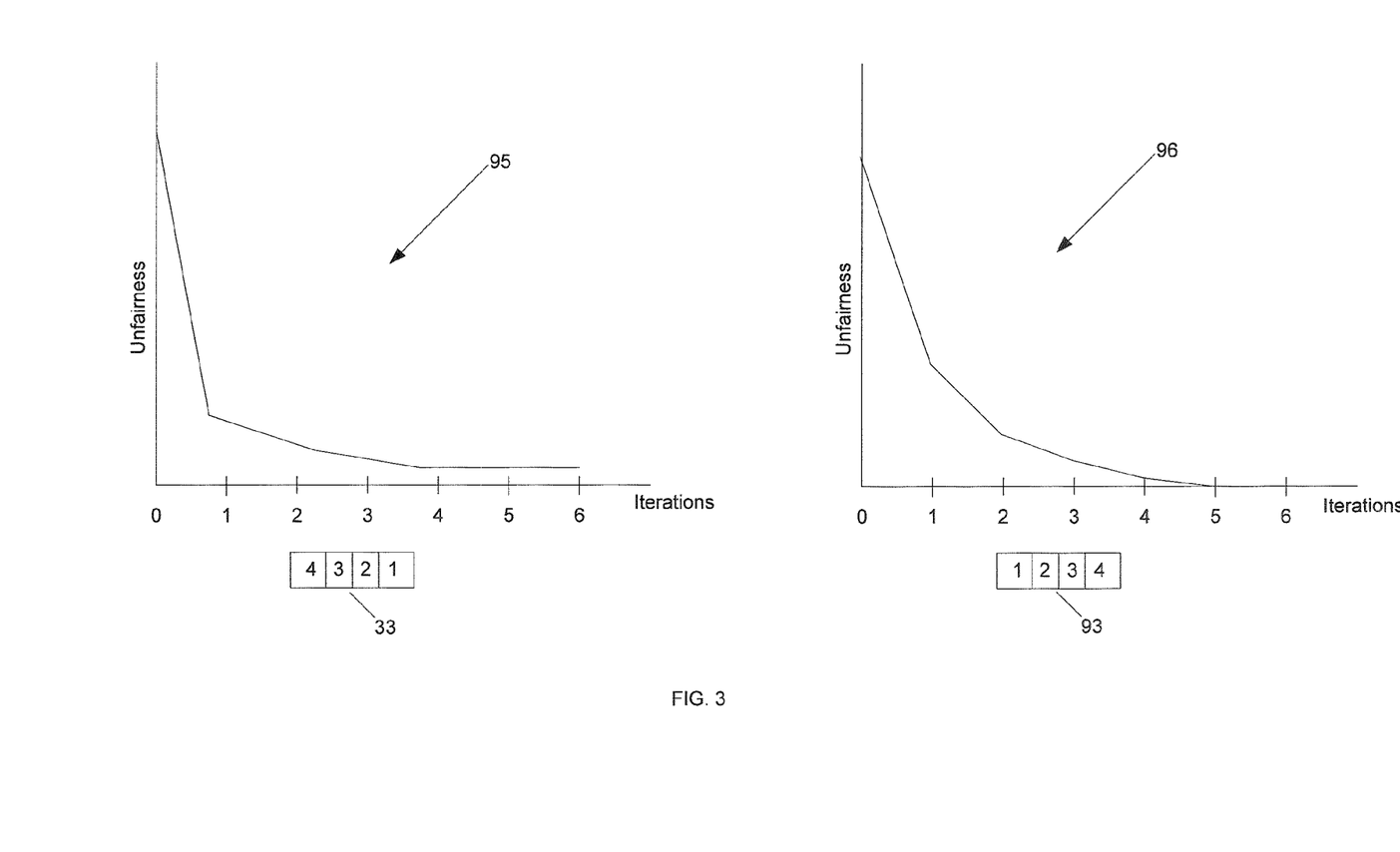
FIG. 3 illustrates a graph of the fairness of bandwidth ratio allocations determined by the CMTS shown in FIG. 2.

The last group of demand values 33 illustrate that perfect fairness cannot always be achieved due to the underlying topology. The target 36 for bonding group C is 24 Mb/s; however, due to topology constraints the most fair bandwidth allocation for bonding group C is 20.1 Mb/s. The FIG. 3 shows a graph 95 illustrating how unfairness drops with each additional iteration until unfairness converges between the fourth and fifth iteration for the demand values 33. The final ratios 39 (FIG. 2) are obtained at the fifth iteration. As stated previously, this fairness computation device 21 can end the algorithm at the earlier of a predetermined number of iterations or when the iterations are yielding no further improvement in fairness. The FIG. 3 shows a second graph 96 illustrating fairness convergence with a different set of demand values 93.

Referring again to FIG. 2, once the final ratios are determined, the fairness computation device 21 controls the transmission of the bonding groups A-D from the CMTS 22 onto the downstream portion of the cable network according to the final ratios. The U.S. patent application Ser. No. 12/353,946 describes one technique for allocating RF bandwidth amongst bonding groups, although any methods may be used in implementing the final ratios so that bandwidth is allocated accordingly.

It should be understood that the final ratios determined by the fairness computation device 21 correspond to the determined demand. However, since the determined demand is based on flow activity, and flow activity changes over time, the fairness computation device 21 should re-calculate demand at regular intervals and repeat the process described above. For example, the fairness computation device 21 could re-calculate demand every five seconds. If there are any changes to assigned DOCSIS priority over time, the re-calculated demand will also address these changes.

The specific demand calculations can be varied. In a preferred example, a flow's DOCSIS priority is included in the aggregate demand for that bonding group only if that flow is active. Since every flow has an associated packet queue, activity can be judged by determining whether or not the associated packet queue is empty. The associated packet queue could be checked a configurable X times during a period of time, and if the queue contains data in a threshold number of the checks, the associated flow would be considered active for that monitoring period. Other specific demand calculations could utilize a fraction of the flow's DOCSIS priority depending on how active the associated queue is during a monitoring period. Other specific demand calculations could use any value that is based on the DOCSIS priority of flows having any activity. In any of these specific calculations, a bonding group's demand is based on the DOCSIS priority of its active flows.

Figure 4:
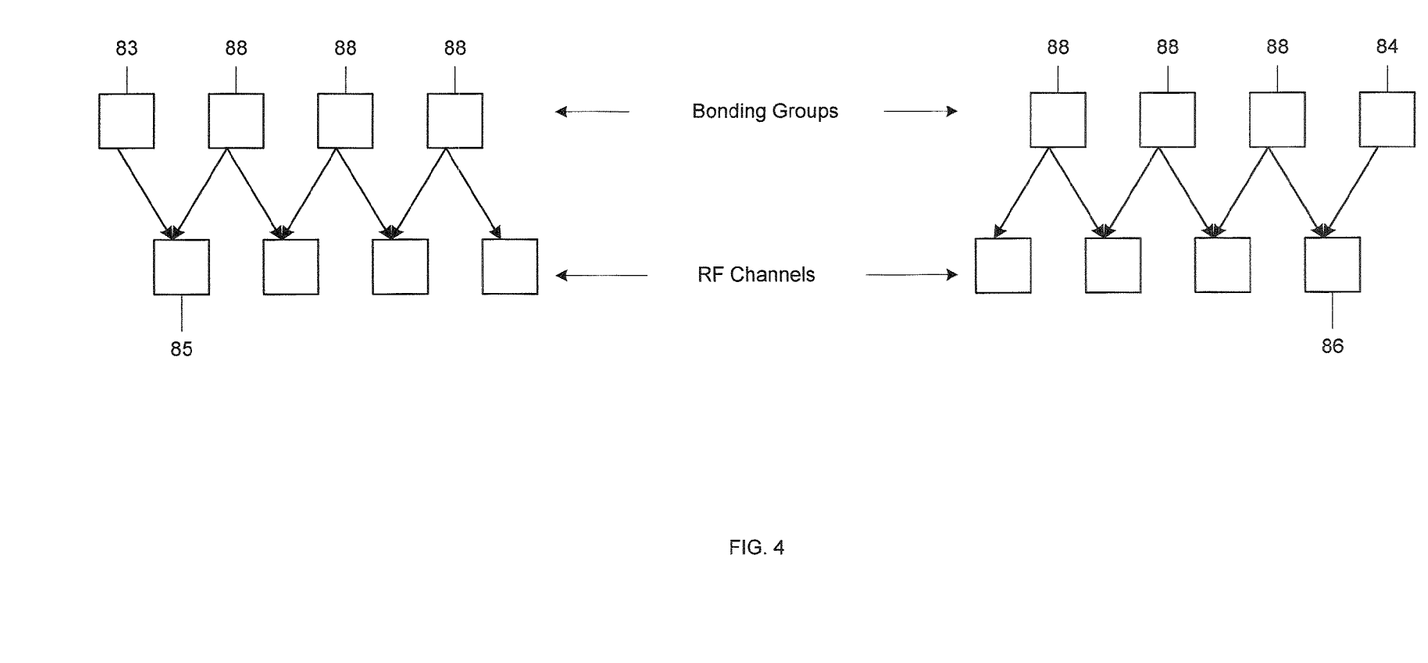
FIG. 4 illustrates a particular bonding group topology to describe how the CMTS shown in FIG. 2 can handle bandwidth allocation in this topology.

In the example described above, bandwidth allocation can be adjusted between two narrowband bonding groups on different RF channels by adjusting bandwidth allocation to a wideband channel that extends across both the RF channels. In some instances, there will be no single wideband channel extending across both the RF channels of the narrowband bonding groups that need adjustment. In these instances, there may be two wideband channels that each utilize a different one of the RF channels but have some other common RF channel. If so, these wideband channels can be adjusted to "shift" bandwidth between the two narrowband bonding groups. This concept can be extended still further as shown in FIG. 4, where, through the above-described process, bandwidth allocation to each of the wideband bonding groups 88 can be adjusted to allow for an increase/decrease of the bandwidth allocation for narrowband bonding group 83 of RF channel 85 and a decrease/increase of the bandwidth allocation for narrowband bonding group 84 of RF channel 86.

Figure 5:
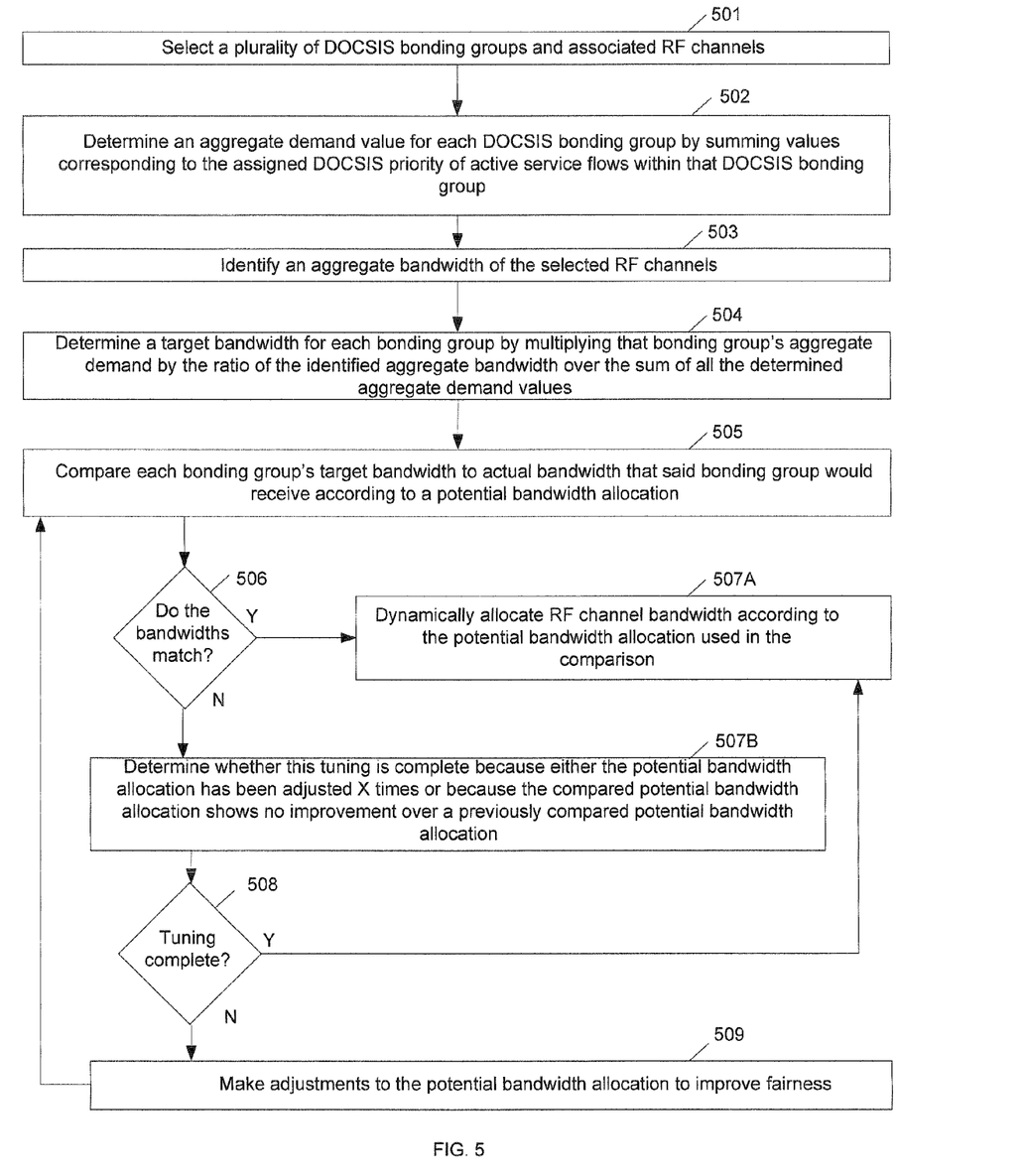
FIG. 5 illustrates how the example CMTS shown in FIG. 2 dynamically and fairly allocates RF channel bandwidth.

FIG. 5 illustrates how the example CMTS shown in FIG. 2 dynamically and fairly allocates RF channel bandwidth.

In block 501, the CMTS 22 selects a plurality of DOCSIS bonding groups and associated RF channels, either according to a preconfigured scheme or via a user input. The CMTS 22 then determines an aggregate demand value for each DOCSIS bonding group by summing values corresponding to the assigned DOCSIS priority of active service flows within that DOCSIS bonding group in block 502.

In block 503, the CMTS 22 identifies an aggregate bandwidth of the selected RF channels. The CMTS 22 then determines a target bandwidth amount for each bonding group by multiplying that the bonding group's aggregate demand by the ratio of the identified aggregate bandwidth over the sum of all the determined aggregate demand values in block 504.

In block 505, the CMTS 22 compares each bonding group's target bandwidth to actual bandwidth that bonding group would receive according to a potential bandwidth allocation. If the bandwidths match (or have less than a threshold difference) in diamond 506, in block 507A the CMTS 22 dynamically allocates RF channel bandwidth according to the potential bandwidth allocation used in the comparison. Otherwise, in block 507B the CMTS 22 determines whether this tuning is complete because either the potential bandwidth allocation has been adjusted X times or because the compared potential bandwidth allocation shows no improvement (or less than a threshold improvement) over a previously compared potential bandwidth allocation.

If tuning is complete in diamond 508, then in block 507A the CMTS 22 dynamically allocates RF channel bandwidth according to the potential bandwidth allocation used in the comparison. Otherwise, if tuning is not complete in block 508, then in block 509 the CMTS 22 makes adjustments to the potential bandwidth allocation to improve fairness, before returning to block 505.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perform some or all of the operations, all of which can be referred to as circuitry herein. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A non-transitory memory device encoded with instructions that, if executed, result in:
asymmetrically associating a plurality of Data Over Cable System Interface Specification (DOCSIS) bonding groups with a plurality of Radio Frequency (RF) channels, wherein the asymmetric association provides a first one of the DOCSIS bonding groups with access to a single one of the RF channels and a second one of the DOCSIS bonding groups with access to more than one of the RF channels;

determining an aggregate demand value for each of the DOCSIS bonding groups of the asymmetric association and a target bandwidth amount for each of the DOCSIS bonding groups of the asymmetric association, the determined aggregate demand values for each DOCSIS bonding group based on assigned DOCSIS priority values of active service flows within that DOCSIS bonding group, wherein the target bandwidth amount for a particular one of the DOCSIS bonding groups of the asymmetric association is the product of that DOCSIS bonding group's aggregate demand value and a ratio of the total bandwidth of all the RF channels over the sum of all of the determined aggregate demand values; and scheduling transmission of downstream DOCSIS bonding group traffic from a Cable Modem Termination System (CMTS) over a cable network according to the target bandwidth amounts, ensuring each active service flow is provided bandwidth substantially in proportion to its corresponding DOCSIS priority.

2. The memory device of claim 1, wherein the instructions, if executed, result in determining the aggregate demand value for each of the DOCSIS bonding groups of the asymmetric association by summing values corresponding to the assigned DOCSIS priority of active service flows within that DOCSIS bonding group.

3. The memory device of claim 1, wherein the instructions, if executed, result in:
if a first potential distribution of RF channel bandwidth amongst the DOCSIS bonding groups of the asymmetric association will result in bandwidth assignments having a threshold difference from the target bandwidth amounts, generating a second potential distribution of RF channel bandwidth amongst the DOCSIS bonding groups of the asymmetric association by adjusting the first potential distribution.

4. The memory device of claim 3, wherein the instructions, if executed, result in:
comparing a first difference between the bandwidth assignments under the first potential distribution and the target bandwidth amounts to a second difference between bandwidth assignments under the second potential distribution and the target bandwidth amounts; and
if the comparison indicates a threshold improvement in the second potential distribution over the first potential distribution, generating a third potential distribution of RF channel bandwidth amongst the DOCSIS bonding groups of the asymmetric association by adjusting the second potential distribution.

5. The memory device of claim 4, wherein the instructions, if executed, result in:
if the comparison does not indicate the threshold improvement in the second potential distribution over the first potential distribution, utilizing the second potential distribution when scheduling the transmission of downstream DOCSIS bonding group traffic.

6. A non-transitory memory device encoded with instructions that, if executed, result in:
asymmetrically associating a plurality of Data Over Cable System Interface Specification (DOCSIS) bonding groups with a plurality of Radio Frequency (RF) channels, wherein the asymmetric association provides a first one of the DOCSIS bonding groups of the asymmetric association with access to a single one of the RF channels and a second one of the DOCSIS bonding groups of the asymmetric association with access to more than one of the RF channels; determining an aggregate demand value for each of the DOCSIS bonding groups of the asymmetric association and a target bandwidth amount for each of the DOCSIS bonding groups of the asymmetric association, wherein the target bandwidth amount for a particular one of the DOCSIS bonding groups of the asymmetric association is the product of that DOCSIS bonding group's aggregate demand value and a ratio of the total bandwidth of all the RF channels over the sum of all of the determined aggregate demand values;

if a first potential distribution of RF channel bandwidth amongst the DOCSIS bonding groups of the asymmetric association will result in bandwidth assignments having a threshold difference from the target bandwidth amounts, generating a second potential distribution of RF channel bandwidth amongst the DOCSIS bonding groups of the asymmetric association by adjusting the first potential distribution;

comparing a first difference between the bandwidth assignments under the first potential distribution and the target bandwidth amounts to a second difference between bandwidth assignments under the second potential distribution and the target bandwidth amounts; if the comparison indicates a threshold improvement in the second potential distribution over the first potential distribution, generating a third potential distribution of RF channel bandwidth amongst the DOCSIS bonding groups of the asymmetric association by adjusting the second potential distribution;

repeating the comparison between a newest difference and a previous difference until reaching an earlier of N comparisons or one of the comparisons indicating no significant improvement; and scheduling transmission of downstream DOCSIS bonding group traffic from a Cable Modem Termination System (CMTS) over a cable network according to the target bandwidth amounts, ensuring each active service flow transmitted via one or more of the DOCSIS bonding groups is provided bandwidth substantially in proportion to its corresponding DOCSIS priority.

7. The memory device of claim 1, wherein the CMTS is an Integrated CMTS (I-CMTS) or a Modular CMTS (M-CMTS).

8. The memory device of claim 3, wherein generating the second potential distribution includes:
selecting, from the DOCSIS bonding groups of the asymmetric association, a first DOCSIS bonding group having a greatest bandwidth surplus;
filtering the DOCSIS bonding groups of the asymmetric association to identify only those one(s) sharing at least one of the first DOCSIS bonding group's RF channels;
selecting, from the filtered DOCSIS bonding groups of the asymmetric association, a second DOCSIS bonding group having a greatest bandwidth deficit; and
shifting surplus bandwidth from the first DOCSIS bonding group to the second DOCSIS bonding group.

9. The memory device of claim 8, wherein generating the second potential distribution includes:
after adjusting the first potential distribution by shifting the surplus bandwidth, selecting, from the DOCSIS bonding groups of the asymmetric association, a third DOCSIS bonding group having a greatest bandwidth deficit;
re-filtering the DOCSIS bonding groups of the asymmetric association to identify only those one(s) sharing at least one of the third DOCSIS bonding group's RF channels;
selecting, from the re-filtered DOCSIS bonding groups of the asymmetric association, a fourth DOCSIS bonding group having a greatest bandwidth surplus; and
shifting surplus bandwidth from the fourth DOCSIS bonding group to the third DOCSIS bonding group.

10. The memory device of claim 1, wherein the instructions, if executed, result in repeating the determining and the scheduling at regular intervals.

11. A Cable Modem Termination System (CMTS), comprising:
a network interface to receive, from an access network, data to be transmitted on a cable network; and
a fairness computation device in communication with the network interface and configured to:
determine an aggregate demand value for a plurality of Data Over Cable System Interface Specification (DOCSIS) bonding groups associated with Radio Frequency (RF) channels, wherein a first one of the DOCSIS bonding groups utilizes a single one of the RF channels and a second one of the DOCSIS bonding groups utilizes more than one of the RF channels;
determine a target bandwidth amount for the DOCSIS bonding groups, the determined aggregate demand values for each DOCSIS bonding group based on assigned DOCSIS priority values of active service flows within that DOCSIS bonding group, wherein the target bandwidth amount for a particular one of the DOCSIS bonding groups is the product of that DOCSIS bonding group's aggregate demand value and a ratio of the total bandwidth of all the RF channels over the sum of all of the determined aggregate demand values; and
schedule transmission of downstream DOCSIS bonding group traffic from the CMTS over the cable network according to the target bandwidth amounts, ensuring each active service flow is provided bandwidth substantially in proportion to its corresponding DOCSIS priority.

12. The CMTS of claim 11, wherein the fairness computation device is configured to:
monitor transmission buffers associated with service flows of the DOCSIS bonding groups;
identify an assigned Quality of Service (QoS) metric for at least some of the service flows; and
determine the aggregate demand values according to the monitoring and the identified QoS metrics.

13. The CMTS of claim 12, wherein the fairness computation device is configured to:
determine whether or not the transmission buffers associated with the flows of the DOCSIS bonding groups contain a threshold amount of data during a monitoring window; and
identify the assigned QoS metric for only those service flows that correspond to those buffers containing the threshold amount of data during the monitoring window.

14. The CMTS of claim 12, wherein the assigned QoS metric is an assigned DOCSIS priority value ranging from zero to seven.

15. The CMTS of claim 11, wherein the fairness computation device is configured to repeat the determinations and the scheduling at regular intervals.

16. A method, comprising: determining an aggregate demand value for a plurality of Data Over Cable System Interface Specification (DOCSIS) bonding groups associated with Radio Frequency (RF) channels, wherein a first one of the DOCSIS bonding groups utilizes a single one of the RF channels and a second one of the DOCSIS bonding groups utilizes more than one of the RF channels;

determining a target bandwidth amount for the DOCSIS bonding groups, the determined aggregate demand values for each DOCSIS bonding group based on assigned DOCSIS priority values of active service flows within that DOCSIS bonding group, wherein the target bandwidth amount for a particular one of the DOCSIS bonding groups is the product of that DOCSIS bonding group's aggregate demand value and a ratio of the total bandwidth of all the RF channels, over the sum of all of the determined aggregate demand values;

scheduling transmission of downstream DOCSIS bonding group traffic from a Cable Modem Termination System (CMTS) over a cable network according to the target bandwidth amounts; and transmitting received data downstream from the CMTS over the cable network according to the scheduling, ensuring each active service flow is provided bandwidth substantially in proportion to its corresponding DOCSIS priority.

17. The method of claim 16, further comprising:
monitoring activity of service flows associated with the DOCSIS bonding groups;
identifying an assigned Quality of Service (QoS) metric for at least some of the service flows; and
determining the aggregate demand values according to the flow activity monitoring and the identified QoS metrics.

18. The method of claim 16, further comprising:
comparing each DOCSIS bonding group's target bandwidth amount to actual bandwidth that the respective DOCSIS bonding group would receive under a potential bandwidth allocation.

19. The method of claim 18, further comprising:
if the comparison indicates more than a threshold difference, determine whether the potential bandwidth allocation has been adjusted a predetermined number of times or whether the comparison indicates no threshold improvement over a previous comparison; and
if the potential bandwidth allocation has not been adjusted a predetermined number of times and if the comparison indicates at least the threshold improvement over the previous comparison, adjusting the potential bandwidth allocation to improve fairness.

20. The method of claim 19, further comprising:
if the potential bandwidth allocation has been adjusted the predetermined number of times or if the comparison indicates no threshold improvement over the previous comparison, then dynamically allocate RF channel bandwidth amongst the DOCSIS bonding groups according to the potential bandwidth allocation.

\* \* \* \* \*